United States Patent [19]

Ribaldone et al.

[11] 4,098,793
[45] Jul. 4, 1978

[54] ANTHRAQUINONE COMPOUNDS AND PROCESS FOR PREPARING SAME

[75] Inventors: Giuseppe Ribaldone, Gallarate (Varese); Renato Grecu, Cameri (Novara); Camillo Paffoni, Pogno (Novara); Giuseppe Sironi, Novara, all of Italy

[73] Assignee: Montedison S.p.A., Milan, Italy

[21] Appl. No.: 836,087

[22] Filed: Sep. 23, 1977

[30] Foreign Application Priority Data

Sep. 27, 1976 [IT] Italy ................. 27683 A/76

[51] Int. Cl.² ........................................... C07D 285/10
[52] U.S. Cl. ..................................... 260/303; 8/1 D;
8/34; 8/36; 8/37; 8/39 R; 8/40; 106/22;
106/288 Q; 260/18 PF; 260/30.4 R; 260/39 P;
260/42.21
[58] Field of Search ....................................... 260/303

[56] References Cited

U.S. PATENT DOCUMENTS

| | | | |
|---|---|---|---|
| 2,870,172 | 1/1959 | Schoenauer | 260/368 |
| 2,925,421 | 2/1960 | Pizzarello et al. | 260/272 |
| 3,157,667 | 11/1964 | Kern et al. | 260/303 |
| 3,304,310 | 2/1967 | Hari et al. | 260/303 |
| 3,823,167 | 7/1974 | Peters et al. | 260/303 |

FOREIGN PATENT DOCUMENTS

| | | | |
|---|---|---|---|
| 859,343 | 1/1961 | United Kingdom | 260/368 |
| 923,530 | 4/1963 | United Kingdom | 260/368 |

*Primary Examiner*—Alton D. Rollins
*Attorney, Agent, or Firm*—Morgan, Finnegan, Pine, Foley & Lee

[57] ABSTRACT

The present invention relates to a new class of compounds belonging to the anthraquinone series, having the general formula:

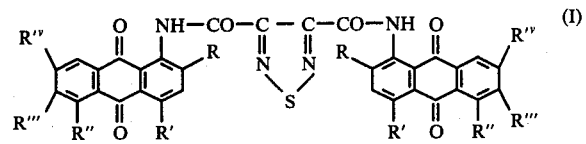

wherein R, R', R'', R''', R'' are indifferently H or Chlorine, Bromine, $-OH$, $-OCH_3$, $-O-\phi$, $-NH-$Alkyl having 1 to 4 carbon atoms, $-NH-\phi-CH_3$, $-NH-CO-\phi$, $-NH-\phi-NHCOCH_3$.

Such compounds exhibit a color varying from yellow to violet depending on the nature and position of substituents R, R', R'', R''', R'' and, in virtue of their excellent stability characteristics, they are particularly useful as pigments and vat dyes.

This invention relates furthermore to the preparation of compounds having general formula (I) and to the utilization thereof, particularly in the following applications:

pigmentation of plastic materials, such as polyvinyl chloride, polystyrene, polyolefins, polymethylmethacrylate, polycarbonates and ABS copolymers (acrylonitrile-butadiene-styrene);

pigmentation of varnishes, stoving enamels, inks and pastes for the printing of textiles;

vat dyeing of cellulose fibres such as cotton, flax, rayon.

12 Claims, No Drawings

ANTHRAQUINONE COMPOUNDS AND PROCESS FOR PREPARING SAME

BACKGROUND OF THE INVENTION

As far as it is known, the anthraquinone derivatives of 1,2,5-thiadiazole-3,4-dicarboxylic acid of formula (I), which are the object of the present invention, are not described in the Art.

The prior Art, however not directly pertinent, generically describes dyestuffs of the anthraquinone series deriving from dicarboxylic acids, for example benzenic, pyridinic, aliphatic acids etc.

OBJECTS OF THE INVENTION

It is an object of this invention to provide a new class of anthraquinone compounds of general formula (I), having useful applications in the field of the pigments and of the vat dyes. Another object is to provide a process for preparing same.

GENERAL DESCRIPTION OF THE INVENTION

These and still other objects, that will more clearly appear to those skilled in the Art from the following description, are achieved by compounds having general formula (I), prepared by means of a process characterized in that the dichloride of 1,2,5-thiadiazole-3,4-dicarboxylic acid (II) is reacted with 1-aminoanthraquinone or substituted derivatives (III) thereof according to a substantially stoichiometric molar ratio, in the presence of an inert solvent, at a temperature ranging from 100° to about 170° C.

The reaction can be schematically represented by the following equation (1):

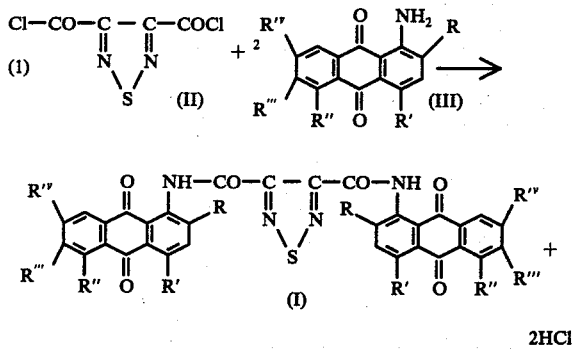

wherein R', R", R'", R"" have the meaning already specified; HCl forms and liberates as a gas from the reacting mixture. It is not necessary, therefore, to employ basic substances to neutralize hydrochloric acid. As mentioned hereinbefore, the reaction is conducted in an inert solvent and at a temperature comprised between 100° and about 170° C, preferably between 120° and about 150° C.

1-aminoanthraquinones (III) employable in the present invention are in particular:
1-aminoanthraquinone, 1-amino-4-hydroxyanthraquinone, 1-amino-4-benzamidoanthraquinone, 1-amino-5-benzamidoanthraquinone, 1-amino-4-(p-acetamidoanilino)-anthraquinone, 1-amino-4-(p-toluidino)-anthraquinone, 1-amino-5-methoxyanthraquinone, 1-amino-2-phenoxy-4-hydroxyanthraquinone, 1-amino-2,4-dibromoanthraquinone, 1-amino-2-bromo-4-hydroxyanthraquinone, 1-amino-6,7-dichloroanthraquinone etc.

As inert solvent it is possible to use chlorobenzene, the various dichlorobenzenes and trichlorobenzenes, and nitrobenzenes.

The time required for the reaction varies from 2 to 8 hours, depending on the reaction temperature and on the type of 1-aminoanthraquinones utilized. The molar ratio is practically stoichiometric, that is: 2 moles of anthraquinone compound (III) for 1 mole of dichloride (II).

The raw materials necessary for the process according to this invention are easily available, as 1-aminoanthraquinone and the substituted derivatives (III) thereof are commercial products usually employed as intermediates for dyestuffs and pigments.

As to the dichloride of 1,2,5-thiadiazole-3,4-dicarboxylic acid (II), such product is known since long and is obtained, according to known techniques, by chlorination with $SOCl_2$ of the monopotassium salt of 1,2,5-thiadiazole-3,4-dicarboxylic acid, that is, in its turn, a known compound.

According to an effective embodiment, the present invention is conducted by operating in practice as follows: the dichloride of 1,2,5-thiadiazole-3,4-dicarboxylic acid (II) and the 1-aminoanthraquinone or its substituted derivatives (III) are heated, after mixing in the inert solvent, to 100°–170° C, preferably to 120°–150° C, until the anthraquinone compound (III) has thoroughly disappeared.

The thin layer chromatography is useful for this check.

At the end of the reaction the reaction mixture is filtered, preferably in hot conditions, and the pigment cake is then washed with the reaction solvent and successively with methanol until the washings result colourless.

The pigments obtained according to this invention are substances exhibiting a colour varying from yellow to violet and characterized by a high insolubility in the common organic solvents and by a high melting point, generally higher than 300° C.

To impart the particular desired applicative characteristics to the products so obtained it is impossible to utilize the grinding, for example in a ball mill, or the precipitation from sulphuric acid and in general the techniques already known.

Also for the dyeing of plastic materials, of varnishing products and for the vat dyeing the pigments of the present invention are consistent with the conventional techniques.

Due to the simple preparation conditions and applicative characteristics of the obtained pigments, the present invention appears particularly advantageous.

Preparation and application of the present invention will be now described more in detail in the following examples, which are given, however, by way of example only.

EXAMPLE 1

A mixture of 22.11 g of 1-aminoanthraquinone, 10.45 g of dichloride of 1,2,5-thiadiazole-3,4-dicarboxylic acid and 250 cc of o-dichlorobenzene was heated under stirring for 2 hours up to 120° C and then kept at 130° C for 3 hours. After this time period no further evolvement of gaseous hydrochloric acid was noticed. The condensation solid product was then hot filtered, washed with hot o-dichlorobenzene and then with methanol until washings were colourless. After drying, 27.83 g of a yellow pigment having the following structural formula were obtained:

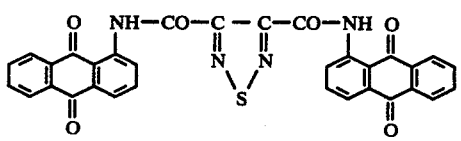

The elemental analysis, the IR spectrum and the mass spectrum were in accordance with the formula proposed.

EXAMPLE 2

A mixture of 4.78 g of 1-amino-4-hydroxyanthraquinone, 2.50 g of dichloride of 1,2,5-thiadiazole-3,4-dicarboxylic acid and 80 cc of o-dichlorobenzene was heated under stirring for 5 hours up to 130° C.

Following the operative modalities described in example 1, 5.50 g of an orange-brown pigment having the following structural formula were obtained:

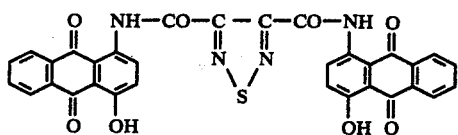

The elemental analysis, the IR spectrum and the mass spectrum were in accordance with the formula proposed.

EXAMPLE 3

A mixture containing 7.0 g of 1-amino-4-benzamidoanthraquinone, 2.30 g of dichloride of 1,2,5-thiadiazole-3,4-dicarboxylic acid and 50 cc of o-dichlorobenzene was heated under stirring for 6 hours to 140° C. Operating according to the operative modalities described in example 1, 7.20 g of a yellow-brown pigment having the following structural formula were obtained:

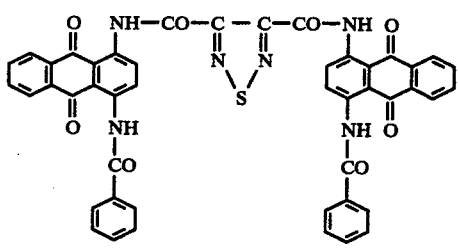

The elemental analysis, the IR spectrum and the mass spectrum were in accordance with the formula proposed.

EXAMPLE 4

A mixture of 3.42 g of 1-amino-5-benzamidoanthraquinone, 1.15 g of dichloride of 1,2,5-thiadiazole-3,4-dicarboxylic acid and 50 cc of o-dichlorobenzene was heated under stirring for 6 hours at 140° C.

Following the operative modalities described in example 1, 4.0 g of a yellow pigment having the following structural formula were obtained:

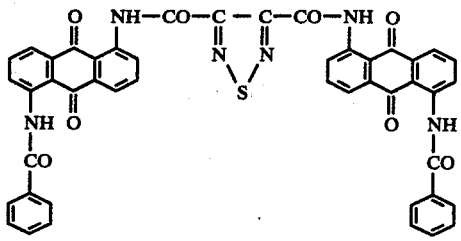

The elemental analysis, the IR spectrum and the mass spectrum were in accordance with the formula proposed.

EXAMPLE 5

A mixture of 5.0 g of 1-amino-4-(p-acetamidoanilino)-anthraquinone, 1.30 g of dichloride of 1,2,5-thiadiazole-3,4-dicarboxylic acid and 50 cc of o-dichlorobenzene was heated under stirring for 5 hours to 120°-130° C. Following then the operative modalities of example 1, 4.80 g of a blue pigment having the following structural formula were obtained:

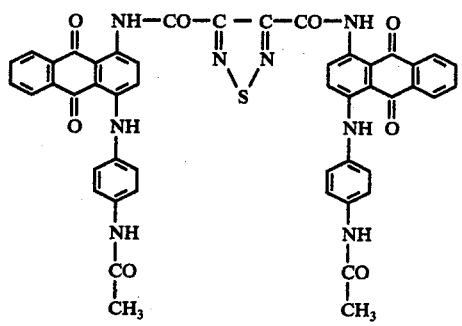

The elemental analysis, the IR spectrum and the mass spectrum were in accordance with the proposed formula.

EXAMPLE 6

A mixture of 3.28 g of 1-amino-4 (p-toluidino)anthraquinone, 1.20 g of dichlorine of 1,2,5-thiadiazole-3,4-dicarboxylic acid and 50 cc of o-dichlorobenzene was heated under stirring for 6 hours at 150° C. Following then the operative modalities described in example 1, 3.50 g of a blue pigment having the following structural formula were obtained:

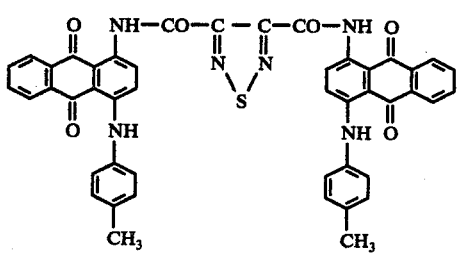

The elemental analysis, the IR spectrum and the mass spectrum were in accordance with the formula proposed.

EXAMPLE 7

A mixture of 5.10 g of 1-amino-5-methoxyanthraquinone, 2.10 g of dichloride of 1,2,5-thiadiazole-3,4-dicarboxylic acid and 90 cc of o-dichlorobenzene was heated under stirring for 5 hours to 120°–130° C. Operating then according to the operative modalities described in example 1, 5.4 g of a yellow pigment having the following structural formula were obtained:

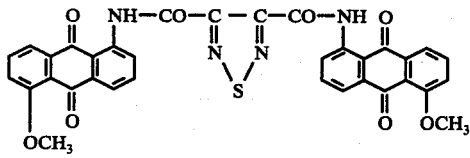

The elemental analysis, the IR spectrum and the mass spectrum were in accordance with the formula proposed.

EXAMPLE 8

A mixture of 3.31 g of 1-amino-2-phenoxy-4-hydroxyanthraquinone, 1.10 g of dichloride of 1,2,5-thiadiazole-3,4-dicarboxylic acid and 50 cc of o-dichlorobenzene was heated under stirring for 6 hours up to 130° C. Following then the operative modalities described in example 1, 3.20 g of a yellow pigment having the following structural formula were obtained:

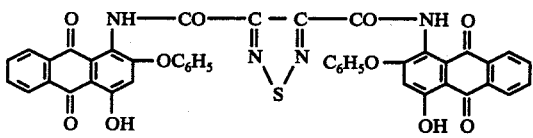

The elemental analysis, the IR spectrum and the mass spectrum were in accordance with the formula proposed.

EXAMPLE 9

A mixture of 7.62 g of 1-amino-2,4-dibromoanthraquinone, 2.50 g of dichloride of 1,2,5-thiadiazole-3,4-dicarboxylic acid and 50 cc of o-dichlorobenzene was heated under stirring for 5 hours up to 130° C. Following then the operative modalities described in example 1, 5.50 g of a yellow pigment having the following structural formula were obtained:

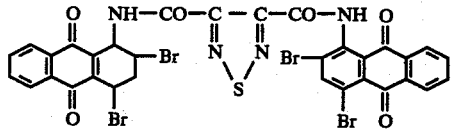

The elemental analysis, the IR spectrum and the mass spectrum were in accordance with the formula proposed.

EXAMPLE 10

A mixture of 6.36 g of 1-amino-2-bromo-4-hydroxyanthraquinone, 2.11 g of dichloride of 1,2,5-thiadiazole-3,4-dicarboxylic acid and 50 cc of o-dichlorobenzene was heated under stirring for 8 hours to 130° C. Operating then according to the operative modalities described in example 1, 6.30 g of a yellow pigment having the following structural formula were obtained:

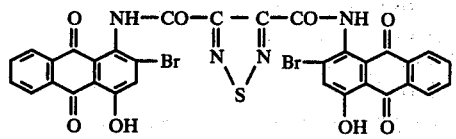

The elemental analysis, the IR spectrum and the mass spectrum were in accordance with the proposed formula.

EXAMPLE 11

A mixture containing 5.84 g of 1-amino-6,7-dichloroanthraquinone, 2.11 g of dichloride of 1,2,5-thiadiazole-3,4-dicarboxylic acid and 50 cc of o-dichlorobenzene was heated under stirring for 4 hours up to 120°–130° C. Operating then according to the modalities described in example 1, 6.60 g of a yellow pigment having the following structural formula were obtained:

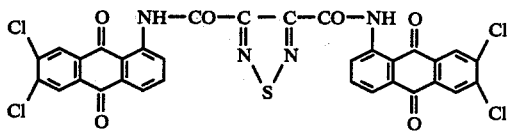

The elemental analysis, the IR spectrum and the mass spectrum were in accordance with the formula proposed.

EXAMPLE 12 (application in PVC)

1.0 g of the pigment prepared according to example 1,
100 g of polyvinyl chloride in powder (PVC),
1.5 g of a Ba complex salt of a higher fatty acid (stearic acid) having a complexing and stabilizing function,
3.0 g of epoxidized soybean oil,
0.5 g of lubricant (a mixture of glycerides from $C_{16}$ to $C_{36}$),
2.0 g of $TiO_2$ were mixed at 70° C in a rotary arm mixer.

The resulting mixture was then treated at 180° C in a three-cylinder refiner until complete dispersion of the pigment. A yellow shade sheet exhibiting excellent stabilities to sunlight and solvents, as well as high characteristics of thermal stability was thus obtained.

EXAMPLE 13 (application in varnishing products)

5.0 g of the pigment obtained according to example 1 were mixed by grinding with 95.0 g of a fluid vehicle having the following composition:
22% of alkyd resin,
19% of melamine resin,
59% of xylene.

Homogenizing was conducted in a ball mill, by grinding the mixture in the presence of porcelain balls having a 10 mm diameter, for a time period of 24 hours. The enamel so obtained was applicated onto the surface to be painted, it was allowed to dry overnight, whereupon it was kept in an oven at 120°–125° C for 30 minutes. A yellow shade painting of high purity, exhibiting excellent stabilities to sunlight, overpainting and heat was so obtained.

In order to obtain a paint having a lighter shade and a higher hiding power, 1 g of the enamel prepared as described hereinbefore was further diluted with 9 g of a white stoving synthetic enamel (10% of TiO₂) having the following composition:
- 30% of alkyd resin,
- 27% of melamine resin,
- 33% of xylene,
- 10% of TiO₂.

Homogenizing was effected in a ball mill by grinding the mixture in the presence of porcelain balls having a 10 mm diameter, for a time period of 24 hours. The cut enamel so obtained was applicated onto the surface to be painted, it was allowed to dry overnight and was then kept in an oven at 120°–125° C for 30 minutes. A painting exhibiting a high-purity light yellow shade and having excellent stabilities to sunlight, overpainting and heat was so obtained.

EXAMPLE 14 (vat dyeing)

1 g of the dyestuff of example 4 was kneaded with 5 cc of ethanol and with a few drops of sodium sulphoricinate, whereupon 100 cc of water and 3.4 cc of caustic soda at 30% were added thereto; the whole was brought to 50° C and successively 1 g of sodium hydrosulphite at 75% was added. The reduction was completed in 10 minutes. The resulting master vat was added to a dyeing bath containing:
- 7 cc/l of 30% NaOH,
- 3 g/l of sodium hydrosulphite at 75%,
- 30 g/l of sodium sulphate;

the dyeing was then effected on 100 g of cotton yarn for 30–40 minutes at 30° C. The dyed material was squeezed and allowed to oxidize in air, developing a yellow shade. Dyeing was completed by carrying out a saponification under boiling for 20 minutes using:
- 2 g/l of Diapon T, a detergent based on sodium oleylmethyl taurinate (Montedison Trade Mark),
- 1 g/l of sodium carbonate.

Finally, the material was rinsed and dried; a yellow dyeing having a good purity degree and high general stabilities was so obtained.

What we claim is:

1. Anthraquinone derivatives characterized by the general formula:

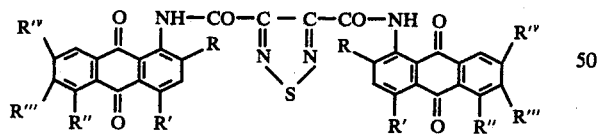

where R, R′, R″, R‴, R⁗ are indifferently

H or Chlorine, Bromine, —OH, —OCH₃,

—O—⟨⟩, —NH—Alkyl having 1 to 4 carbons atoms, —NH—⟨⟩—CH₃,

—NH—CO—⟨⟩, —NH—⟨⟩—NHCOCH₃.

2. A compound having the formula:

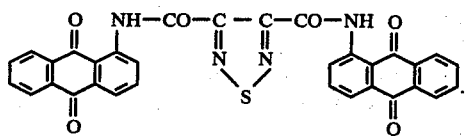

3. A compound having the formula:

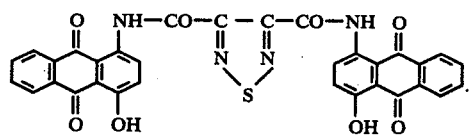

4. A compound having the formula:

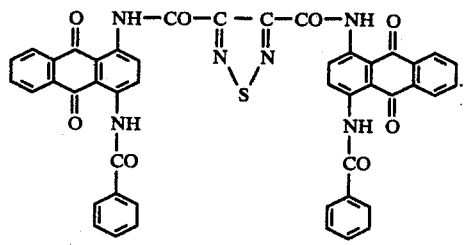

5. A compound having the formula:

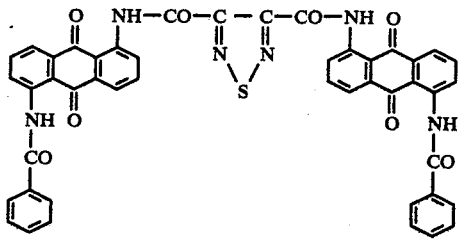

6. A compound having the formula:

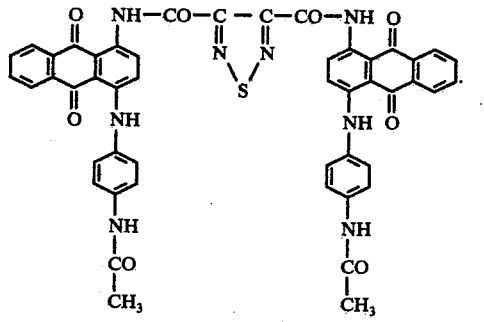

7. A compound having the formula:

8. A compound having the formula:
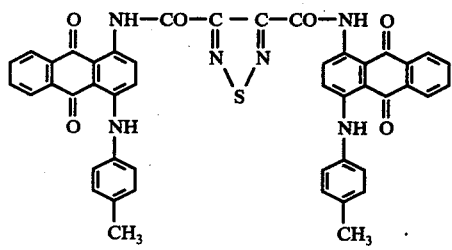
9. A compound having the formula:
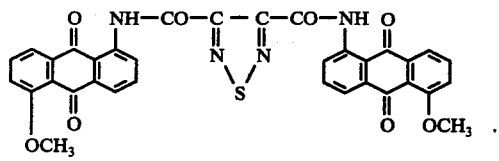
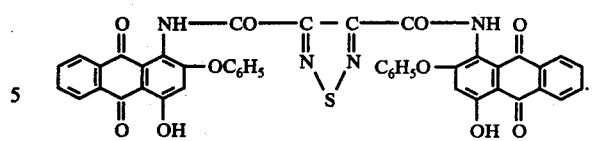
10. A compound having the formula:
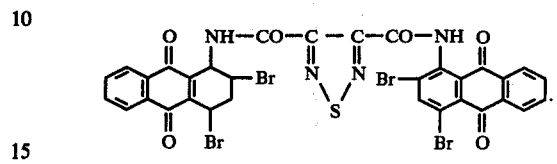
11. A compound having the formula:
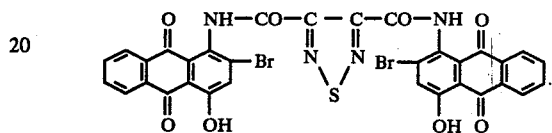
12. A compound having the formula:
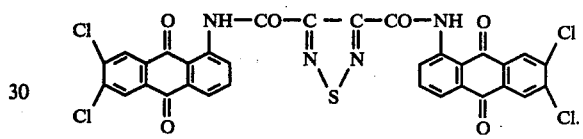
* * * * *